(12) United States Patent
Bellamkonda et al.

(10) Patent No.: US 10,880,898 B2
(45) Date of Patent: Dec. 29, 2020

(54) SYSTEMS AND METHODS FOR MULTI-BAND RESOURCE CONTROL

(71) Applicant: Verizon Patent and Licensing Inc, Arlington, VA (US)

(72) Inventors: Krishna K. Bellamkonda, McKinney, TX (US); Vijay T. Madhav, Folsom, CA (US); Jin Yang, Orinda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 17 days.

(21) Appl. No.: 16/210,660

(22) Filed: Dec. 5, 2018

(65) Prior Publication Data

US 2020/0187212 A1 Jun. 11, 2020

(51) Int. Cl.
| | |
|---|---|
| *H04W 72/06* | (2009.01) |
| *H04W 72/04* | (2009.01) |
| *H04W 16/14* | (2009.01) |
| *H04W 16/18* | (2009.01) |
| *H04W 24/10* | (2009.01) |
| *H04W 24/02* | (2009.01) |

(52) U.S. Cl.
CPC ........... *H04W 72/06* (2013.01); *H04W 16/14* (2013.01); *H04W 16/18* (2013.01); *H04W 24/10* (2013.01); *H04W 72/0453* (2013.01); *H04W 24/02* (2013.01)

(58) Field of Classification Search
CPC ................................................. H04W 72/06
See application file for complete search history.

(56) References Cited

U.S. PATENT DOCUMENTS

| | | | |
|---|---|---|---|
| 2011/0235574 A1* | 9/2011 | DaSilva | H04W 16/02 370/328 |
| 2015/0382214 A1* | 12/2015 | Cheng | H04W 24/08 370/252 |
| 2017/0208476 A1* | 7/2017 | Khambekar | H04W 52/242 |
| 2018/0006742 A1* | 1/2018 | Patwardhan | H04W 24/08 |
| 2018/0192329 A1* | 7/2018 | Medapalli | H04L 1/0023 |

* cited by examiner

*Primary Examiner* — Kevin M Cunningham

(57) ABSTRACT

In some implementations, a device may partition a coverage area associated with a network to form one or more geographic sectors, and may determine a pathloss value for each frequency band of multiple frequency bands and a spatial distribution between cells, within the geographic sector, for each frequency band. The device may determine a degree of contiguous coverage for each frequency band within the geographic sector based on the pathloss value and the spatial distribution between cells for that frequency band, and may determine, based on the degree of contiguous coverage for each frequency band, a specific frequency band, of the multiple frequency bands, to be used as a primary carrier for carrier aggregation in the geographic sector. The device may output information that identifies a carrier aggregation profile that indicates the specific frequency band to be used as the primary carrier for carrier aggregation in the geographic sector.

20 Claims, 9 Drawing Sheets

SYSTEMS AND METHODS FOR MULTI-BAND RESOURCE CONTROL

BACKGROUND

A frequency band may refer to an interval in the frequency domain, and may be bounded by a lower frequency and an upper frequency. A radio communication signal occupies a range of frequencies carrying most of the energy of the signal. A frequency band may represent one communication channel or be subdivided into more than one communication channel.

DETAILED DESCRIPTION OF PREFERRED EMBODIMENTS

The following detailed description of example implementations refers to the accompanying drawings. The same reference numbers in different drawings may identify the same or similar elements.

A radio access network may have a variety of parameters that can be configured, and modification of those parameters may impact network performance, such as throughput, spectral efficiency, call continuity, mobility, latency, reliability, and/or the like. Configuring the radio access network to improve performance may be difficult due to a large number of radio access nodes (e.g., base stations and/or the like), different characteristics of those nodes (e.g., different types of nodes, support for different radio access technologies, and/or the like), multiple frequencies supported by each node (e.g., with different signal propagation characteristics), different mobility scenarios between nodes, different numbers and capabilities of user devices in communication with those nodes, different traffic loads across nodes and within nodes at different times, and so on. As an example, determining a frequency band that would provide good performance as a primary carrier for carrier aggregation across multiple nodes, as well as one or more frequency bands that would provide good performance as secondary carrier(s) for carrier aggregation across multiple nodes, may be difficult due to the above factors.

Some techniques and apparatuses described herein permit a network analysis device or system to determine one or more carrier aggregation profiles, including a primary carrier and one or more secondary carrier(s), for a node or across a group of nodes based on a variety of factors associated with the network. In some cases, the network analysis device may use data received from radio access nodes to determine characteristics of those nodes, and may use such information to generate the carrier aggregation profile, to dynamically modify the carrier aggregation profile based on live conditions, and/or to deploy a carrier aggregation profile to one or more radio access nodes. Additional details are provided below.

FIGS. 1A-1F are diagrams of an example implementation 100 described herein.

Figure 1A:
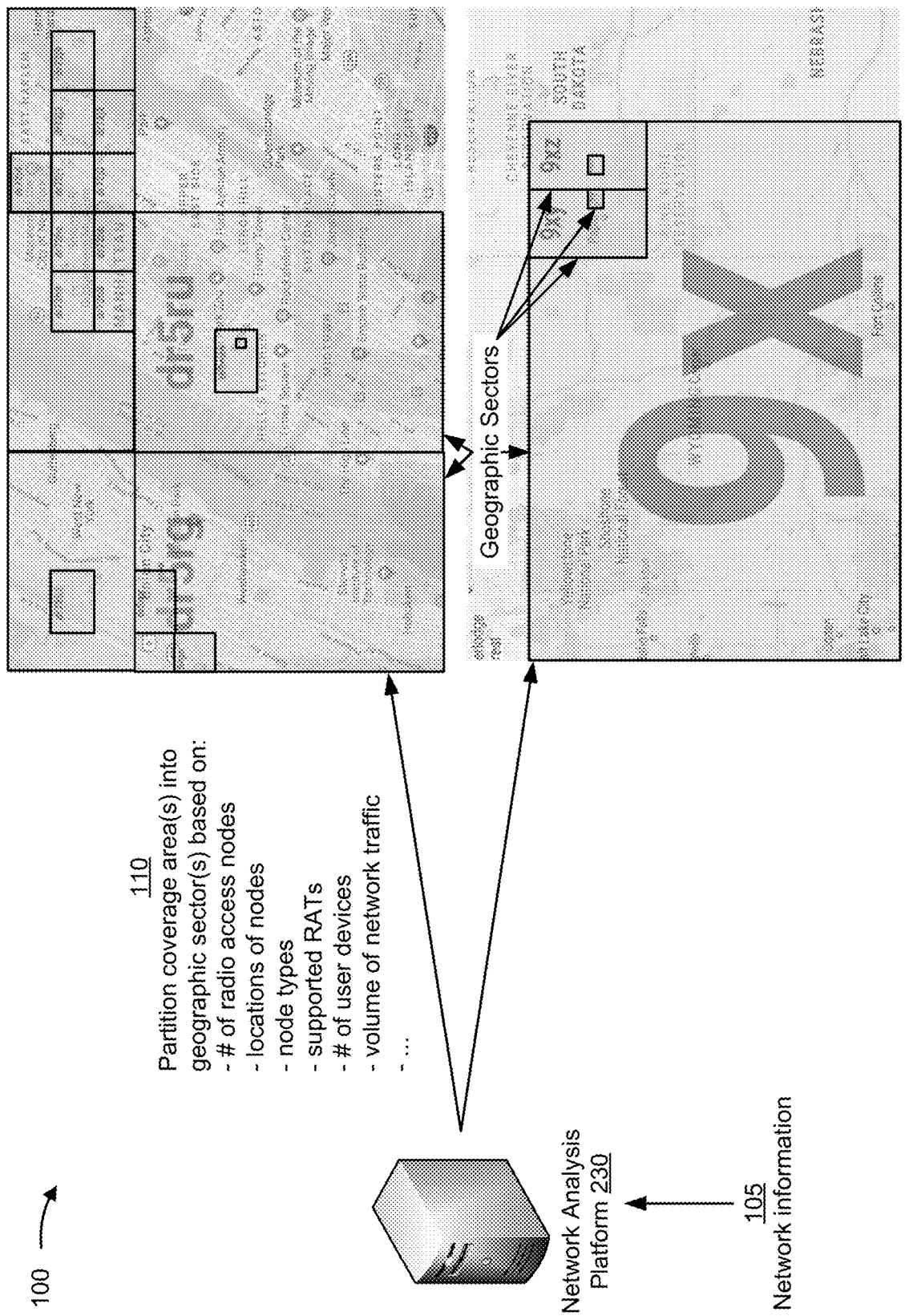
FIGS. 1A-1F are diagrams of an example implementation described herein.

As shown in FIG. 1A, and by reference number 105, a network analysis platform (e.g., shown as network analysis platform 230) may receive network information. The network information may include information about a radio access network (RAN) and/or one or more radio access nodes (sometimes referred to as nodes) included in the radio access network. In some implementations, the network information may be associated with a single network operator (e.g., a mobile network operator (MNO) and/or the like). Alternatively, the network information may be associated with multiple network operators.

The network information may include, for example, information that identifies coverage areas (e.g., cells and/or the like) of nodes included in the RAN. For example, the network information may identify a geographic area covered by a node and/or a cell of the node. Additionally, or alternatively, the network information may indicate a number of nodes in the RAN. Additionally, or alternatively, the network information may indicate, for one or more nodes, a geographic location of a node, a node type of the node (e.g., a macro node, a micro node, a femto node, a pico node, and/or the like), a ratio of a number of nodes of a first type and a number of nodes of a second type, whether the node is located indoors or outdoors, one or more radio access technologies (RATs) supported by the node (e.g., 3G, 4G, 5G, and/or the like), a capability of the node to support one or more user device types (e.g., machine-type communication (CAT-M) devices, narrowband Internet of Things (NB-IoT) devices, one or more user equipment (UE) categories, and/or the like), an average number of user devices served by the node (e.g., over all times, in a specific time window, for a specific type of user device, and/or the like), an average volume of network traffic processed by the node (e.g., for one or more types of network traffic, such as one or more traffic classes), and/or the like.

In some implementations, the network information may indicate dynamic information that changes over time, such as a number of user devices in communication with a node (e.g., at a specific time), a volume of network traffic served by the node (e.g., at a specific time), and/or the like.

In some implementations, the network information may be relatively static, and may be provided to the network analysis platform by a network storage device, such as a network orchestration device, a device used for network planning, and/or the like. Additionally, or alternatively, the network information may be relatively dynamic, and may be provided to the network analysis platform in real-time or near real-time to adapt to changing network conditions, such as by a node, by one or more devices in a core network (e.g., a mobility management entity (MME), a packet gateway (PGW), a serving gateway (SGW), and/or the like. In some implementations, the network information may be periodically provided to the network analysis platform, such as every hour, every 12 hours, every day, every week, and/or the like.

As shown by reference number 110, the network analysis platform may partition a coverage area into one or more geographic sectors. A geographic sector may have defined geographic boundaries (e.g., indicated by a set of geographic coordinates and/or the like). Although the geographic sectors in FIG. 1A are shown as being rectangular in shape, a geographic sector may have a different shape (e.g., any polygon, a circle, an oval, an irregular shape, and/or the like). The network analysis platform may use the network information, as described above, to partition the coverage area into one or more geographic sectors. In some implementations, the network analysis platform may perform such partitioning for multiple coverage areas. In some implementations, the network analysis platform may perform the partitioning for a set of nodes associated with a network and/or a network operator (e.g., in a specific geographic region). In some implementations, the network analysis platform may perform the partitioning for all nodes associated with a network and/or a network operator (e.g., an entire coverage area associated with the network and/or the network operator).

In some implementations, the network analysis platform may partition the coverage area to form geographic sectors from which statistically relevant data can be obtained. For example, the network analysis platform may create a geographic sector such that a threshold number of nodes (e.g., of one or more types, that support one or more RATs, that are indoors, that are outdoors, that support one or more user device types, and/or the like) are included in the geographic sector, such that a threshold number (e.g., an average number) of user devices are served by the nodes included in the geographic sector, such that a threshold volume (e.g., an average volume) of network traffic is served by the nodes included in the geographic sector, such that a threshold ratio of nodes of different types is satisfied, and/or the like. Additionally, or alternatively, the network analysis platform may create a geographic sector such that an inter-site distance between two radio nodes (e.g., an average distance, a minimum distance, a maximum distance, and/or the like) satisfies a threshold. In some implementations, the inter-site distance between multiple sets of nodes (e.g., pairs of nodes) may indicate a node density. In some implementations, the network analysis platform may create a geographic sector such that the node density satisfies a threshold.

In some implementations, the network analysis platform may analyze trends in one or more of the above parameters to predict future growth or decline in the parameters and/or to identify patterns in the parameters, and may use such trends to partition the coverage area (e.g., such that one or more thresholds are predicted to be satisfied at a future time). In this way, the network analysis platform may use a statistically relevant amount of data to predict network conditions and configure network parameters based on accurate and statistically relevant data.

Figure 1B:
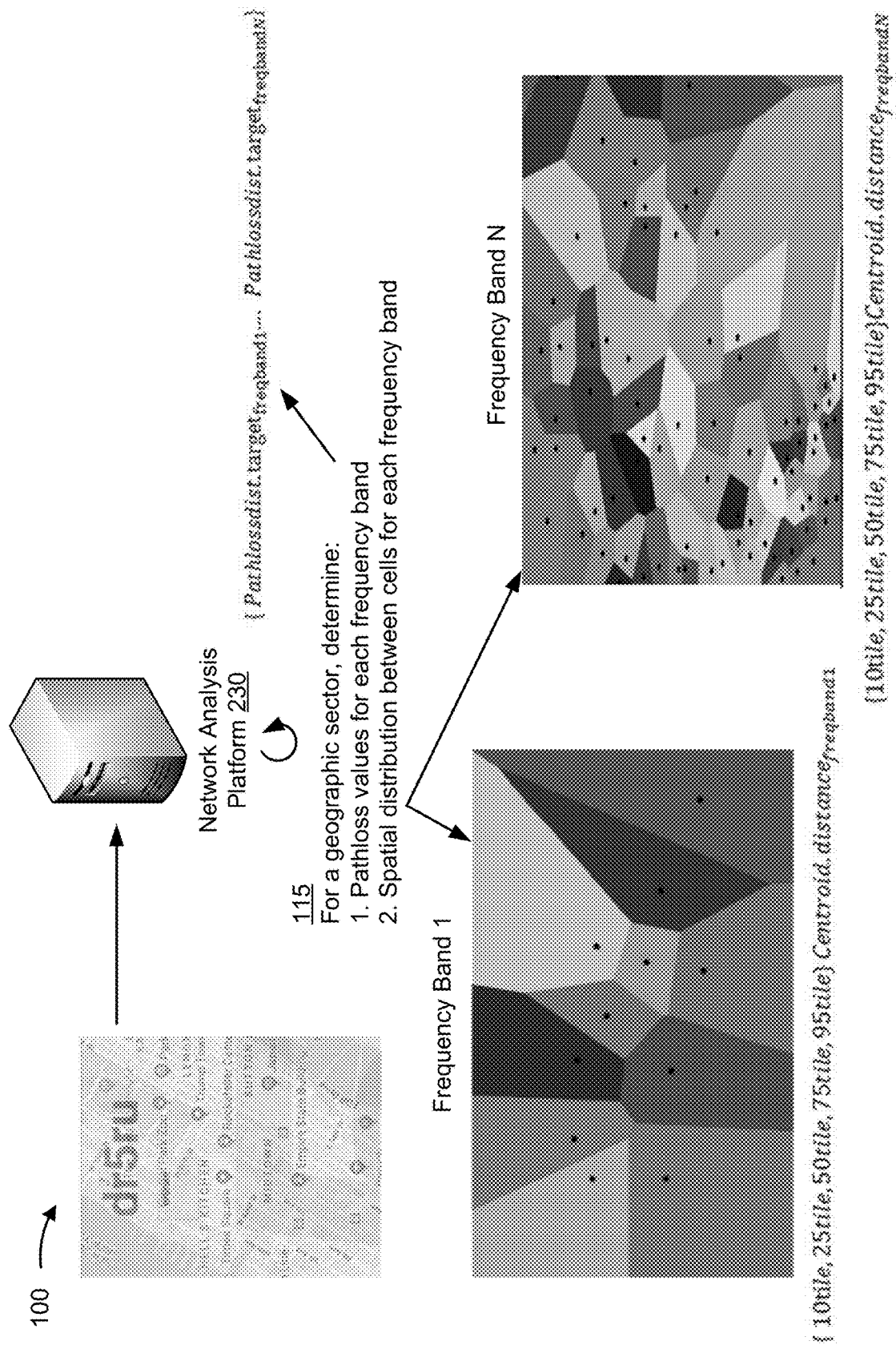

As shown in FIG. 1B, and by reference number 115, the network analysis platform may determine a pathloss value for one or more frequency bands used in the geographic sector. For example, the network analysis platform may determine a pathloss value for each (e.g., all) of the frequency bands used in the geographic sector. The frequency bands (sometimes referred to as frequency layers) may include, for example, 3G frequency bands, 4G frequency bands, 5G frequency bands, unlicensed frequency bands (e.g., on the unlicensed spectrum), and/or the like.

In some implementations, the pathloss value may include a pathloss target. A pathloss target may represent a target distance for good signal propagation characteristics from a node. In some implementations, a pathloss target for a frequency band may be pre-determined, and the network analysis platform may use a stored value. For example, the pathloss target may be a fixed value per frequency band, may be an optimal value per frequency band (e.g., derived using machine learning, artificial intelligence, and/or the like), and/or the like. Additionally, or alternatively, the pathloss target may be computed based on an equation for free space path loss (FSPL), such as:

$$FSPL = 20\log_{10}(d) + 20\log_{10}(f) + 20\log_{10}\left(\frac{4\pi}{c}\right) - G_t - G_r$$

In the above equation for FSPL, d represents the distance between antennas (e.g., between a node and a user device), f represents the frequency of a communication, c represents the speed of light, $G_t$ represents the gain of the transmitting antenna, and $G_r$ represents the gain of the receiving antenna. In some implementations, the network analysis platform may derive d to estimate the pathloss target for a frequency band. As shown in FIG. 1B, the pathloss target for frequency band N may be represented by Pathlossdist.target$_{freqbandN}$.

As further shown in FIG. 1B, the network analysis platform may determine, for one or more frequency bands, a spatial distribution between cells (e.g., of nodes) used in the geographic sector. For example, for a specific frequency band, the network analysis platform may determine a spatial distribution between cells, in the geographic sector, that use the specific frequency band (e.g., cells having a frequency in the frequency band). In some implementations, the spatial distribution may indicate a node density or a cell density in the geographic sector.

In some implementations, the network analysis platform may determine the spatial distribution between cells using a spatial-geometric technique, such as a centroid distance technique, a Voronoi polygon technique, and/or the like. For example, FIG. 1B shows Voronoi polygons determined for each cell in a geographic sector, where a polygon that includes a particular node also includes all points that are closer to that cell (e.g., node) than to any other cell (e.g., node). The network analysis platform may generate a polygon for each cell (e.g., for each node that supports the cell), may determine a centroid point for each polygon, and may calculate distances between centroid points of different polygons (e.g., referred to as a centroid distance).

In some implementations, the network analysis platform may calculate an average centroid distance for all polygons in the geographic sector. Additionally, or alternatively, the network analysis platform may calculate centroid distances of different percentiles, shown as the $10^{th}$ percentile (10tile), the $25^{th}$ percentile (25tile), the $50^{th}$ percentile (50tile), the $75^{th}$ percentile (75tile), and the $95^{th}$ percentile (95tile). In some implementations, other percentiles may be used. In some implementations, the network analysis platform may use a cumulative distribution function for various samples taken at various distances from the centroid of a polygon to calculate the centroid distance. As shown, the centroid distance for percentile X, calculated for frequency band N, may be represented as $\{Xtile\}Centroid.distance_{freqbandN}$ (sometimes shown as $\{Xtile\}_{freqbandN}$). By calculating the pathloss target and the spatial distribution between cells of a specific frequency, the difference between those values can be determined in order to identify geographic areas that have good coverage on the specific frequency and/or that have bad coverage on the specific frequency.

Figure 1C:
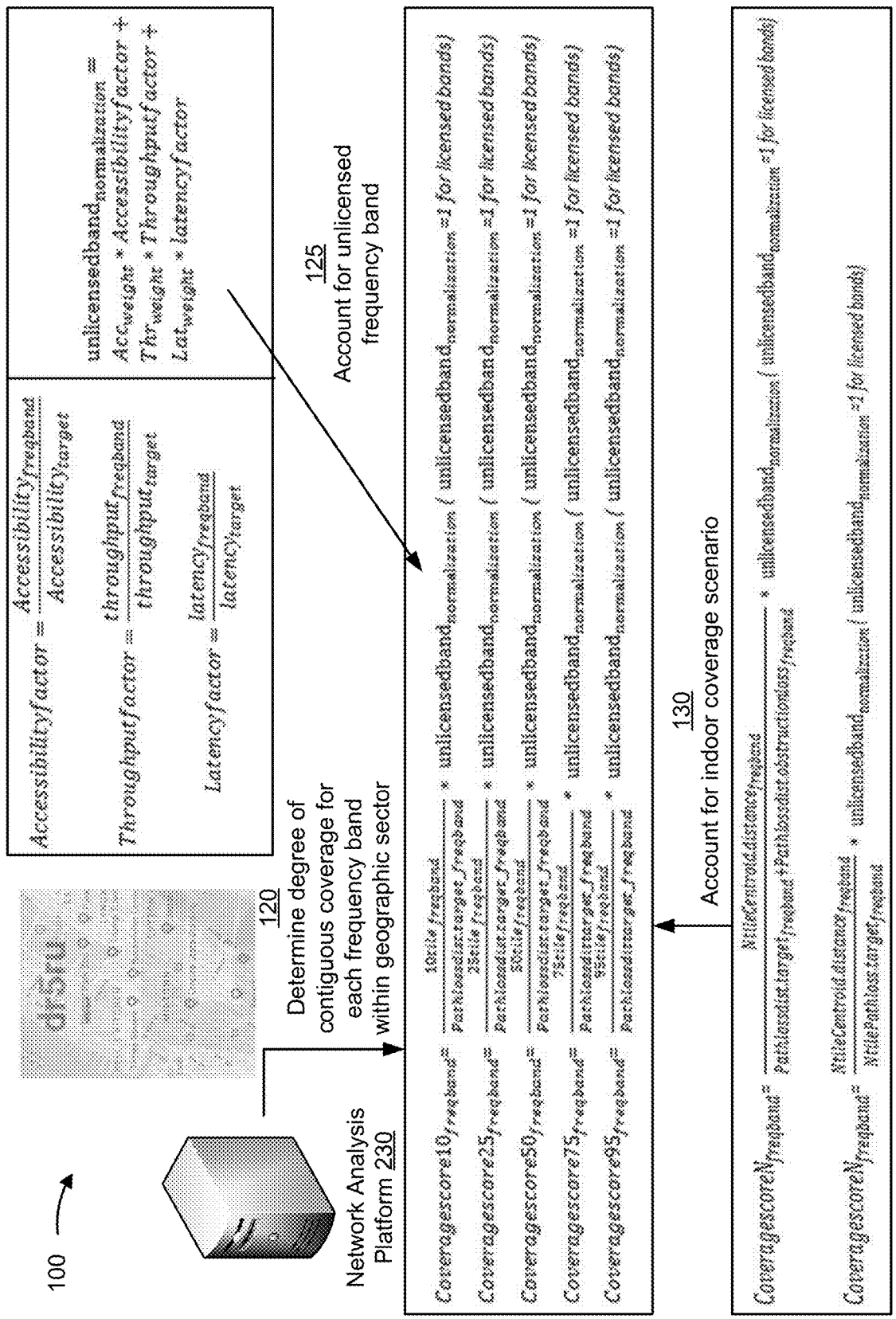

As shown in FIG. 1C, and by reference number 120, the network analysis platform may determine a degree of contiguous coverage for one or more frequency bands within the geographic sector. In some implementations, the network analysis platform may determine the degree of contiguous coverage for a frequency band based on the pathloss value for the frequency band and/or the spatial distribution between cells for that frequency band, as described above in connection with FIG. 1B. For example, the network analysis platform may determine a degree of contiguous coverage (shown as CoverageScore) for frequency band N as follows:

$$Coveragescore_{freqbandN} = \frac{Centroid.\text{distance\_freqbandN}}{Pathlossdist.\text{target\_freqbandN}}$$

In this case, the network analysis platform may divide the determined spatial distribution (e.g., a centroid distance) by the pathloss value (e.g., a pathloss target) to determine the degree of contiguous coverage. For example, if the cells are close together and the distance between cells is less than the pathloss target, then the coverage score (e.g., the degree of contiguous coverage) will have a lower value (e.g., less than 1), indicating better coverage (e.g., the cells have a smaller distance between them than is indicated by the pathloss target). As another example, if the cells are far apart and the distance between cells is greater than the pathloss target, then the coverage score (e.g., the degree of contiguous coverage) will have a higher value (e.g., greater than 1), indicating worse coverage (e.g., the cells have a larger distance between them than is indicated by the pathloss target). In general, the closer a coverage score is to a value of 1, then the closer the cell coverage is to matching a target coverage.

As shown, in some implementations, the network analysis platform may determine a degree of contiguous coverage for multiple centroid distance percentiles. For example, the network analysis platform may determine a degree of contiguous coverage for the Xth percentile (e.g., CoverageScoreX) for frequency band N as follows:

$$CoveragescoreX_{freqbandN} = \frac{\{Xtile\}Centroid.\text{distance\_freqbandN}}{Pathlossdist.\text{target\_freqbandN}}$$

As shown by reference number 125, in some implementations, the network analysis platform may apply a normalization factor (shown as unlicensedband$_{normalization}$) to determine the degree of contiguous coverage for an unlicensed frequency band. In some implementations, the normalization factor may be determined based on one or more measurements associated with the unlicensed frequency band. Additionally, or alternatively, the normalization factor may be determined based on an accessibility factor (shown as Accessibilityfactor), a throughput factor (shown as Throughputfactor), a latency factor (shown as Latencyfactor), a reliability factor (not shown), and/or the like. Because unlicensed frequency bands provide best effort traffic in terms of access to resources being shared by multiple operators, the performance may vary based on traffic profiles. Thus, measurements may be used to calculate a coverage score for unlicensed frequency bands.

As shown, the accessibility factor for a frequency band may be determined based on a measured accessibility (shown as Accessibility$_{freqband}$) and/or a target accessibility (shown as Accessibility$_{target}$). In some implementations, the measured accessibility is an accessibility measured using a set of samples on the unlicensed frequency band. In some implementations, the target accessibility may be derived from an accessibility associated with one or more licensed frequency bands. For example, the target accessibility may be set to an average accessibility of licensed frequency band(s), a specific percentile of accessibility (e.g., 90$^{th}$ percentile and/or the like) on licensed frequency band(s), and/or the like. Additionally, or alternatively, the target accessibility may be a fixed value stored in memory of the network analysis platform.

As shown, the throughput factor for a frequency band may be determined based on a measured throughput (shown as throughput$_{freqband}$) and/or a target throughput (shown as throughput$_{target}$). In some implementations, the measured throughput is a throughput measured using a set of samples on the unlicensed frequency band. In some implementations, the target throughput may be derived from a throughput associated with one or more licensed frequency bands. For example, the target throughput may be set to an average throughput (e.g., downlink throughput) of licensed frequency band(s), a specific percentile of throughput (e.g., 90$^{th}$ percentile and/or the like) on licensed frequency band(s), and/or the like. Additionally, or alternatively, the target throughput may be a fixed value stored in memory of the network analysis platform.

As shown, the latency factor for a frequency band may be determined based on a measured latency (shown as latency$_{freqband}$) and/or a target latency (shown as latency$_{target}$). In some implementations, the measured latency is a latency measured using a set of samples on the unlicensed frequency band. In some implementations, the target latency may be derived from a latency associated with one or more licensed frequency bands. For example, the target latency may be set to an average latency of licensed frequency band(s), a specific percentile of latency (e.g., 90$^{th}$ percentile and/or the like) on licensed frequency band(s), and/or the like. Additionally, or alternatively, the target latency may be a fixed value stored in memory of the network analysis platform. In some implementations, a reliability factor may be determined in a similar manner as the accessibility factor, the throughput factor, and/or the latency factor (e.g., based on a measured reliability and/or a target reliability).

As shown, the network analysis platform may combine one or more factors described above to determine a normalization factor for the unlicensed frequency band. For example, the network analysis platform may sum the factors to determine the normalization factor, may calculate a weighted sum (e.g., using one or more weights for the one or more factors, such as an accessibility weight Acc$_{weight}$, a throughput weight Thr$_{weight}$, a latency weight Lat$_{weight}$, a reliability weight, and/or the like). As shown, the coverage score for an unlicensed frequency band may be calculated as follows:

$$Coveragescore_{freqbandN} = \frac{Centroid.\text{distance\_freqbandN}}{Pathlossdist.\text{target\_freqbandN}} \times unlicenseband_{normalization}$$

As further shown, this equation may also be used to calculate the coverage score for a licensed frequency band if the value of the normalization factor is set to one (or some other fixed value) for such calculation. In this way, the performance of an unlicensed frequency band may be normalized in comparison with one or more licensed frequency band performance targets, such that the potential contribution of the unlicensed frequency band to assist with carrier aggregation can be accounted for in a determination of which frequency bands to use for carrier aggregation, as will be described in more detail below.

As shown by reference number 130, in some implementations, the network analysis platform may determine a pathloss value for an indoor coverage scenario, and may apply that pathloss value when determining the degree of contiguous coverage (e.g., the coverage score) for a frequency band in an indoor coverage scenario (e.g., a frequency band with a threshold degree of indoor coverage in the geographic sector). In some implementations, the network analysis platform may apply an obstruction loss value (e.g., Pathlossdist.obstructionloss$_{freqband}$) to a target pathloss value (e.g., Pathlossdist.target$_{freqband}$) to determine a pathloss target for the frequency band in the indoor coverage scenario. For example, the network analysis platform may calculate an estimated pathloss value due to obstruction loss (e.g., shown as Pathlossdist.target$_{freqband}$+Pathlossdist.obstructionloss$_{freqband}$), and may use that value as the pathloss value when calculating the degree of contiguous coverage, as shown by the following equation, for example (e.g., with a normalization factor being applied for an unlicensed frequency band).

$$CoveragescoreN_{freqband} = \frac{NtileCentroid.distance_{freqband}}{Pathlossdist.target_{freqband} + Pathlossdist.obstructionloss_{freqband}}$$

In some implementations, the network analysis platform may derive the obstruction loss value from metadata such as a type of construction material used for a building and/or used in a geographic sector, building density, and/or the like. Additionally, or alternatively, the network analysis platform may measure a pathloss value, using samples from user devices on the frequency band in the indoor coverage scenario, to determine a measured pathloss value, and may use the measured pathloss value as the pathloss target (e.g., Pathloss.target$_{freqband}$), as shown, for example, by the following equation (e.g., with a normalization factor being applied for an unlicensed frequency band).

$$CoveragescoreN_{freqband} = \frac{NtileCentroid.distance_{freqband}}{NtilePathloss.target_{freqband}}$$

In this way, the network analysis platform may account for frequency bands in an indoor coverage scenario having different pathloss characteristics than frequency bands in an outdoor coverage scenario.

Figure 1D:
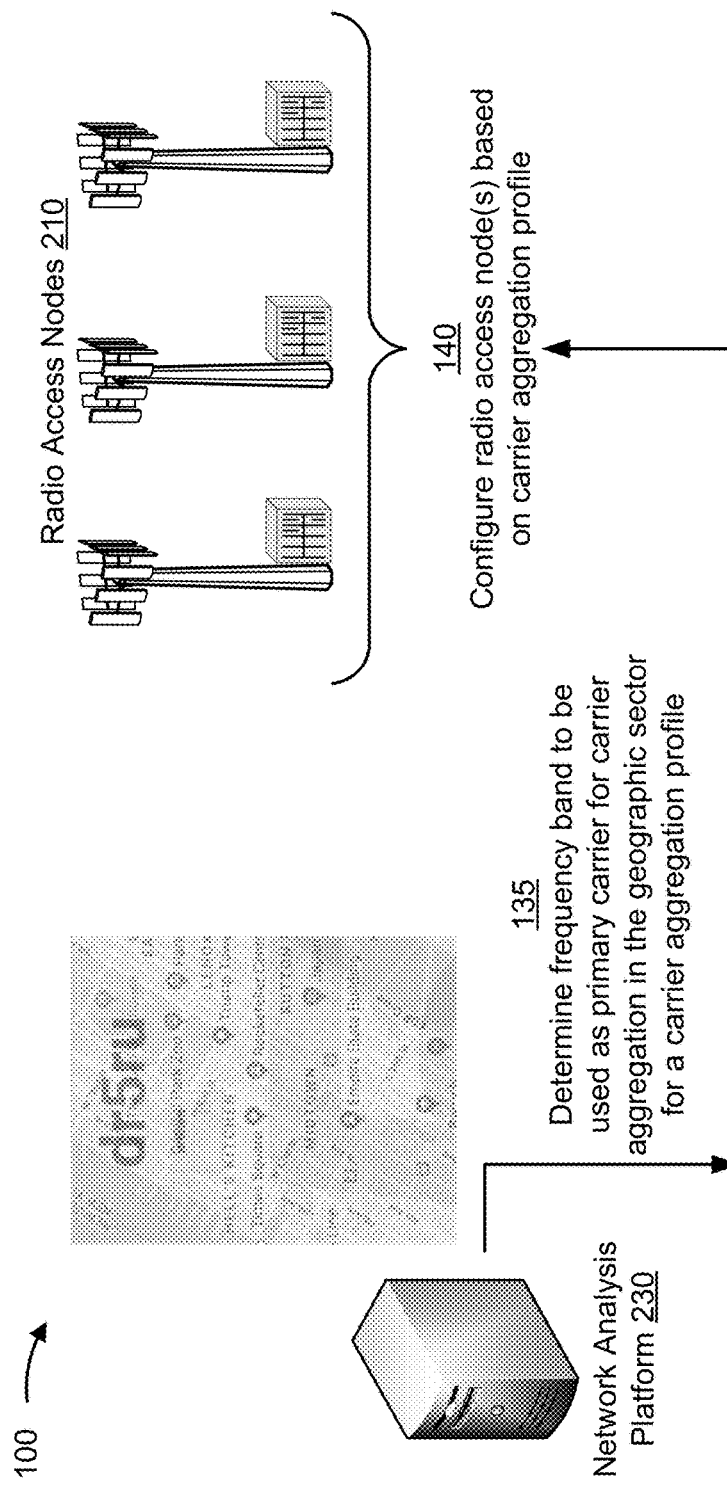

As shown in FIG. 1D, the network analysis platform may determine a specific frequency band, of the frequency bands analyze for the geographic sector, to be used as a primary carrier (e.g., shown as FreqBand$_{primary}$) for carrier aggregation in the geographic sector. In some implementations, the network analysis platform may determine the frequency band to be used as the primary carrier based on the degree of contiguous coverage (e.g., a coverage score calculated for one or more percentiles).

For example, the network analysis platform may calculate a statistical convergence coverage score (e.g., shown as Coverage$_{stat-conv}$) for each analyzed frequency band. The statistical convergence coverage score may indicate a degree to which the frequency band provides widespread coverage in different regions of the geographic sector, or the degree to which the frequency band provides sporadic coverage in the geographic sector. When the frequency band provides widespread coverage, then the frequency band is a good candidate for the primary carrier in the geographic sector because coverage can be maintained throughout a wide area of the geographic sector. When the frequency band provides sporadic coverage, then the frequency band is a poor candidate for the primary carrier in the geographic sector because coverage cannot be maintained throughout a wide area of the geographic sector.

As shown, in some implementations, the network analysis platform may calculate the statistical convergence coverage score based on a first coverage score for a high percentile (e.g., greater than the $50^{th}$ percentile, and shown as the $75^{th}$ percentile) and a second coverage score for a low percentile (e.g., less than the $50^{th}$ percentile, and shown as the $25^{th}$ percentile). For example, the network analysis platform may determine the statistical convergence coverage score by subtracting the second coverage score from the first coverage score, as shown by the below equation:

$$Coverage_{stat-conv} = Coveragescore75_{freqband} - Coveragescore25_{freqband}$$

In some implementations, the network analysis platform may discard one or more frequency bands from consideration as the primary carrier and/or as a secondary carrier in the geographic sector based on a statistical convergence coverage score. For example, if the statistical convergence coverage score indicates that the frequency band is not widespread in the geographic sector (e.g., based on the statistical convergence coverage score satisfying a threshold), then that frequency band may be discarded from consideration. For the remaining frequency bands, the network analysis platform may calculate an average coverage score (e.g., for the $50^{th}$ percentile, or for another percentile). The network analysis platform may identify a frequency band, with an average coverage score that satisfies a threshold, as the primary carrier for the geographic sector. For example, the frequency band with the lowest average coverage score, as compared to other frequency bands in the geographic sector (e.g., indicating that the frequency band has the best coverage in the geographic sector), may be assigned as the primary carrier for the geographic sector.

As shown by reference number 140, the network analysis platform may configure one or more nodes (e.g., shown as radio access nodes 210) in the geographic sector based on identifying the frequency band to be used as the primary carrier in the geographic sector. For example, the network analysis platform may output an instruction for the nodes to use the frequency band as the primary carrier. In some implementations, the network analysis platform may determine a carrier aggregation profile for the geographic sector. A carrier aggregation profile may indicate a frequency band to be used as the primary carrier for carrier aggregation and/or one or more frequency bands to be used as secondary carriers for carrier aggregation. The network analysis platform may output the carrier aggregation profile to the nodes in order to configure the nodes with the carrier aggregation profile (e.g., with the primary carrier and/or secondary carrier(s)). In some implementations, the network analysis platform may determine multiple carrier aggregation profiles corresponding to different network conditions, as described in more detail below.

Figure 1E:
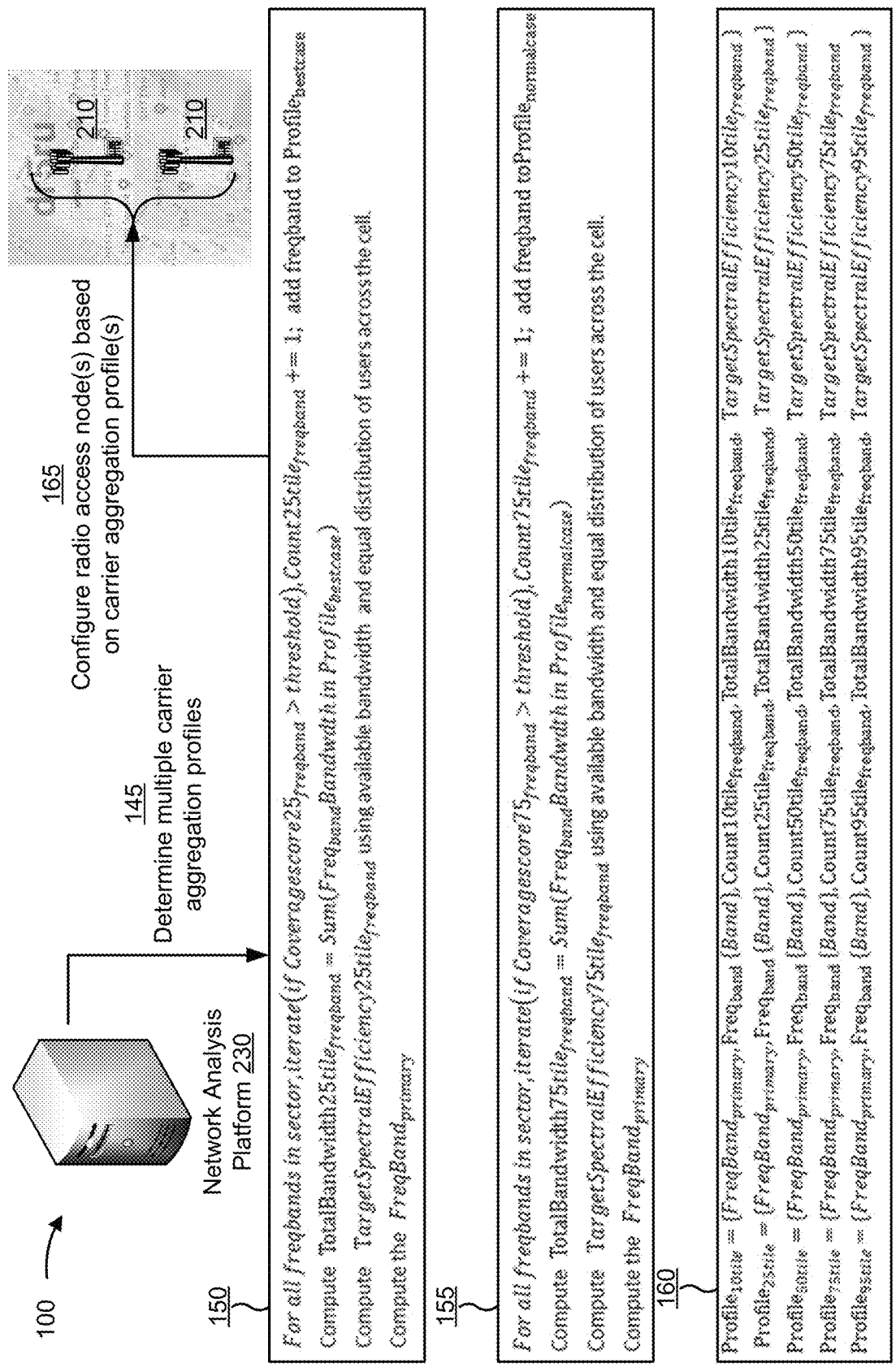

As shown in FIG. 1E, and by reference number 145, the network analysis platform may determine multiple carrier aggregation profiles. Each carrier aggregation profile may indicate a frequency band to be used as a primary carrier and a set of frequency bands to be used as secondary carrier(s). In some implementations, different carrier aggregation profiles may be associated with different network conditions. For example, different carrier aggregation profiles may be used depending on an available bandwidth of a node and/or a set of nodes in the geographic sector, a contiguity constraint to be applied to carrier aggregation in the geographic sector (e.g., whether the frequency bands used for carrier aggregation must be contiguous in frequency, or whether the frequency bands used for carrier aggregation can be non-contiguous in frequency), a radio access technology used by a node and/or a set of nodes in the geographic sector, a mobility constraint for the geographic sector (e.g., a mobility of user devices in the geographic sector and/or across geographic sectors), and/or the like.

As shown by reference number 150, the network analysis platform may calculate an aggressive (e.g., shown as best case) carrier aggregation profile (e.g., which may include frequency bands that provide lesser coverage throughout the geographic sector). The illustrated aggressive carrier aggregation profile uses coverage scores and other parameters from the $25^{th}$ percentile as an example, but other percentiles may be used. Similarly, as shown by reference number 155, the network analysis platform may calculate a conservative (e.g., shown as normal case) carrier aggregation profile (e.g., which may include frequency bands that provide greater coverage throughout the geographic sector). The illustrated conservative carrier aggregation profile uses coverage scores and other parameters from the $75^{th}$ percentile as an example, but other percentiles may be used.

To determine the frequency bands to be included in a carrier aggregation profile for a percentile, the network analysis platform may compare the percentile coverage score for each frequency band to a threshold. If the percentile coverage score for a frequency band satisfies the threshold, then the frequency band may be included in the carrier aggregation profile. If the percentile coverage score for a frequency band does not satisfy the threshold, then the frequency band may be excluded from the carrier aggregation profile. In some implementations, the threshold may be a fixed value, may be determined based on network conditions, may be determined using machine learning and/or artificial intelligence, and/or the like. In some implementations, the network analysis platform may determine a frequency band, from the frequency bands included in the carrier aggregation profile, to be used as the primary carrier (e.g., as described above in connection with FIG. 1D).

In some implementations, the network analysis platform may keep track of the number of frequency bands included in a carrier aggregation profile by incrementing a counter value (shown as $CountXtile_{freqband}$) for each frequency band added to the carrier aggregation profile. Additionally, or alternatively, the network analysis platform may calculate a total bandwidth for carrier aggregation in the carrier aggregation profile by summing the bandwidths of each frequency band (shown as $Freq_{band}Bandwidth$) included in the carrier aggregation profile. Additionally, or alternatively, the network analysis platform may determine a target spectral efficiency (shown as TargetSpectralEfficiency) for the carrier aggregation profile based on the total bandwidth and a number of user devices that use the frequency band (e.g., assuming an equal distribution of user devices across a cell).

As shown by reference number 160, in some implementations, the network analysis platform may calculate a carrier aggregation profile for one or more (e.g., each) determined percentile (e.g., for different coverage score percentiles, centroid distance percentiles, and/or the like). In some implementations, different carrier aggregation profiles may have different primary carriers (shown as $FreqBand_{primary}$). In some implementations, different carrier aggregation profiles may each have a different set of secondary carriers (shown as $Freq_{band}\{Band\}$). In some implementations, different carrier aggregation profiles may have different total bandwidths (e.g., based on the number and bandwidth of frequency bands included in the carrier aggregation profile). In some implementations, different carrier aggregation profiles may have different target spectral efficiencies. However, in some cases, different carrier aggregation profiles may have the same primary carrier, the same set of secondary carriers, the same bandwidth, the same target spectral efficiency, and/or the like.

As shown by reference number 165, the network analysis platform may configure one or more nodes in the geographic sector using one or more carrier aggregation profiles (e.g., in a similar manner as described above in connection with FIG. 1D). For example, the network analysis platform may select a carrier aggregation profile to be used by a set of nodes (e.g., based on network conditions, conditions in the geographic sector, network information described elsewhere herein, and/or the like), and may output an instruction for the set of nodes to use the selected carrier aggregation profile (e.g., the primary carrier and/or the set of secondary carriers indicated in the carrier aggregation profile). Additionally, or alternatively, the network analysis platform may output multiple carrier aggregation profiles to the nodes, and/or may indicate network conditions for which different carrier aggregation profiles are to be applied. In this case, a node may determine network conditions and may dynamically change carrier aggregation profiles based on those network conditions.

Figure 1F:
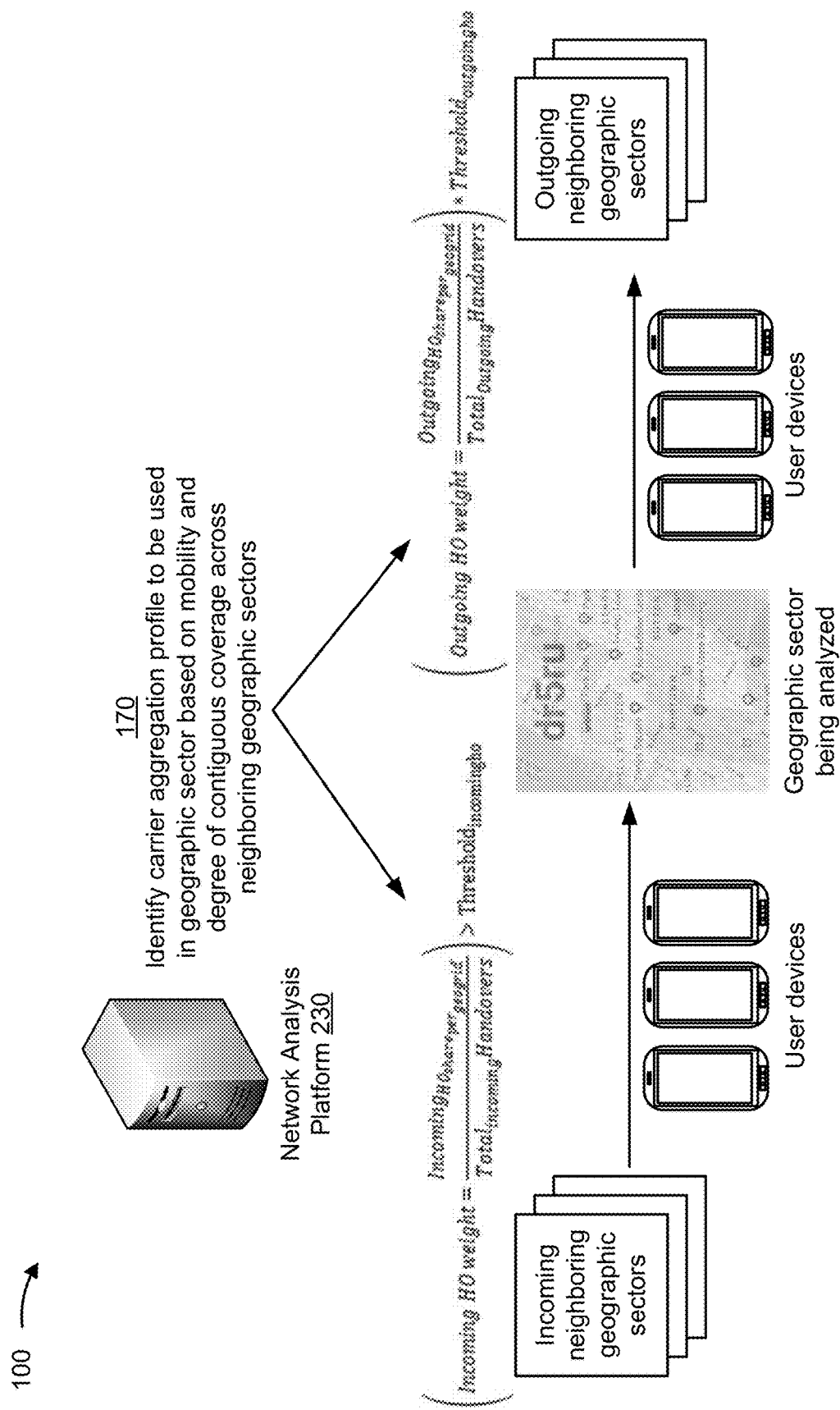

As shown in FIG. 1F, and by reference number 170, in some implementations the network analysis platform may identify a carrier aggregation profile to be used in a geographic sector based on a measured mobility of user devices between the geographic sector and one or more neighboring geographic sectors, and/or based on a degree of contiguous coverage for each frequency band across the geographic sector and the one or more neighboring geographic sectors.

In some implementations, the network analysis platform may determine the neighboring geographic sectors to be used in a carrier aggregation profile analysis based on handover statistics. For example, and as shown, for each neighboring geographic sector, the network analysis platform may determine a number of incoming handovers for a geographic sector (shown as $Incoming_{HOsharepergeogrid}$) and a total number of incoming handovers from all neighboring geographic sectors (shown as $Total_{incoming}Handovers$). These values may be used to calculate an incoming handover score (e.g., an incoming handover weight, shown as Incoming HO weight) for a neighboring cell, as shown, for example, by the following equation.

$$\left( Incoming\ HO\ weight = \frac{Incoming_{HOsharepergeogrid}}{Total_{incoming}Handovers} \right)$$

As shown, the network analysis platform may compare the incoming handover score for a geographic sector to a threshold (shown as $Threshold_{incomingho}$). If the incoming handover score satisfies the threshold, then the geographic sector may be included in a cluster of neighboring geographic sectors used to select a carrier aggregation profile and/or to determine frequency bands to be used as a primary carrier and/or secondary carrier(s) in a carrier aggregation profile. If the incoming handover score does not satisfy the threshold, then the geographic sector may be excluded from a cluster of neighboring geographic sectors used to select a carrier aggregation profile and/or to determine frequency bands to be used as a primary carrier and/or secondary carrier(s) in a carrier aggregation profile.

Similarly, as shown, for each neighboring geographic sector, the network analysis platform may determine a number of outgoing handovers for a geographic sector (shown as Outgoing$_{HOsharepergeogrid}$) and a total number of outgoing handovers to all neighboring geographic sectors (shown as Total$_{outgoing}$Handovers). These values may be used to calculate an outgoing handover score (e.g., an outgoing handover weight, shown as Outgoing HO weight) for a neighboring cell, as shown, for example, by the following equation.

$$\left(\text{Outgoing } HO \text{ weight} = \frac{\text{Outgoing}_{HO_{share_{per_{geogrid}}}}}{\text{Total}_{outgoing}\text{Handovers}}\right)$$

As shown, the network analysis platform may compare the outgoing handover score for a geographic sector to a threshold (shown as Threshold$_{outgoingho}$). If the outgoing handover score satisfies the threshold, then the geographic sector may be included in a cluster of neighboring geographic sectors used to select a carrier aggregation profile and/or to determine frequency bands to be used as a primary carrier and/or secondary carrier(s) in a carrier aggregation profile. If the outgoing handover score does not satisfy the threshold, then the geographic sector may be excluded from a cluster of neighboring geographic sectors used to select a carrier aggregation profile and/or to determine frequency bands to be used as a primary carrier and/or secondary carrier(s) in a carrier aggregation profile.

After the network analysis platform has determined the cluster of geographic sectors, the network analysis platform may determine a base frequency band to be used as a primary carrier for carrier aggregation across the cluster (e.g., for each geographic sector in the cluster). For example, the network analysis platform may apply one or more techniques described elsewhere herein (e.g., in association with FIGS. 1A-1E), but incorporating scores and/or parameters for frequency bands across all geographic sectors in the cluster, rather than for a single geographic sector. Additionally, or alternatively, the network analysis platform may select a carrier aggregation profile, for each geographic sector, that uses the base frequency band as the primary carrier.

In some implementations, the network analysis platform may calculate one or more mobility factors for a geographic sector. For example, the network analysis platform may calculate a mobility factor (e.g., Correction$_{mobility}$) to account for inefficiencies caused by high mobility and resulting handovers of mobile devices with resulting changes to an effective spectral efficiency metric. In some implementations, a mobility factor for a percentile may be determined as a ratio of the number of handovers in that percentile to the number of calls. Alternatively, the mobility factor may be calculated using call records to identify a ratio of mobile users to static users. In some implementations, the network analysis platform may use the mobility factor to select a carrier aggregation profile that satisfies a threshold regarding the mobility factor. In this way, the network analysis platform may assist with maintaining carrier aggregation during handover.

As indicated above, FIGS. 1A-1F are provided as examples. Other examples can differ from what is described with regard to FIGS. 1A-1F. For example, the number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
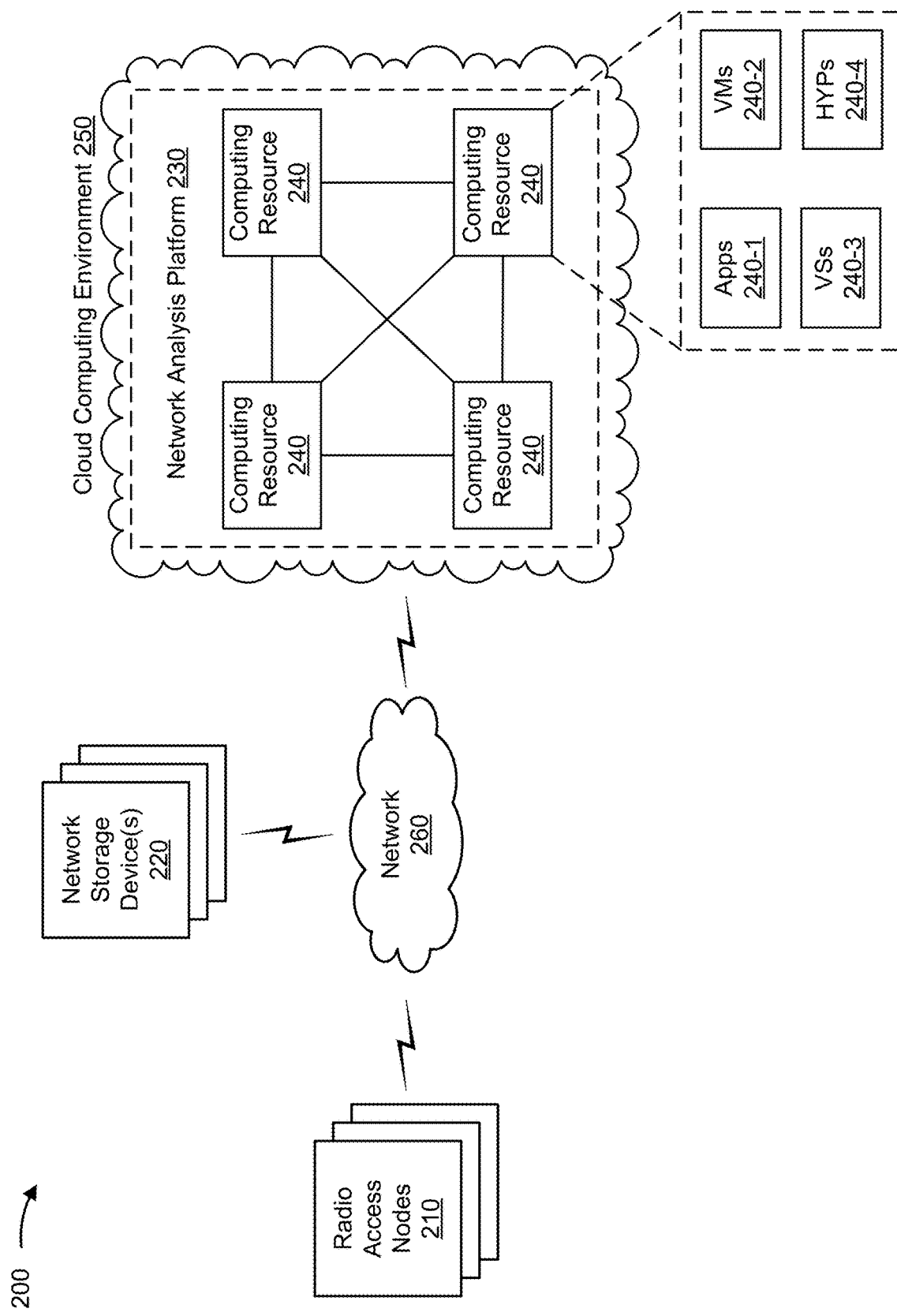
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a set of radio access nodes 210, one or more network storage devices 220, a network analysis platform 230, one or more computing resources 240, a cloud computing environment 250, and/or a network 260. Devices of environment 200 may interconnect via wired connections, wireless connections, or a combination of wired and wireless connections.

Radio access node 210 includes one or more devices capable of communicating with a user device (e.g., a user equipment (UE)) using a cellular radio access technology (RAT). For example, radio access node 210 may include a base station, a base transceiver station, a radio base station, a node B, an evolved node B (eNB), a gNB, a base station subsystem, a cellular site, a cellular tower (e.g., a cell phone tower, a mobile phone tower, etc.), an access point, a transmit receive point (TRP), a radio access node, a macrocell base station, a microcell base station, a picocell base station, a femtocell base station, and/or a similar type of device. Radio access node 210 may transfer traffic between a user device (e.g., using a cellular RAT), other radio access nodes 210 (e.g., using a wireless interface or a backhaul interface, such as a wired backhaul interface), and/or network 260. Radio access node 210 may provide one or more cells that cover geographic areas. Some radio access nodes 210 may be mobile radio access nodes. Some radio access nodes 210 may be capable of communicating using multiple RATs.

In some implementations, radio access node 210 may perform scheduling and/or resource management for user devices within a coverage area of radio access node 210 (e.g., user devices within a coverage area of a cell provided by the radio access node 210). In some implementations, a radio access node 210 may be controlled or coordinated by a network controller (e.g., in a core network), which may perform load balancing, network-level configuration, and/or the like. The network controller may communicate with radio access nodes 210 via a wireless or wireline backhaul. In some implementations, radio access node 210 may include a network controller, a self-organizing network (SON) module or component, or a similar module or component. In other words, a radio access node 210 may perform network control, scheduling, and/or network management functions (e.g., for other radio access nodes 210 and/or for uplink, downlink, and/or sidelink communications of user devices within a coverage area of the radio access node 210). In some implementations, radio access node 210 may include a central unit and multiple distributed units. The central unit may coordinate access control and communication with regard to the multiple distributed units. The multiple distributed units may provide user devices and/or other radio access nodes 210 with access to network 260 (e.g., a core network).

Network storage device 220 includes one or more devices capable of storing, processing, and/or routing network information (e.g., as described above in connection with FIG. 1A). Network storage device 220 may include, for example, a server, a device that stores a database, a device in a cloud computing environment or a data center, a device in a core network of a network operator, a network controller, and/or the like. In some implementations, network storage device 220 may include a communication interface that allows network storage device 220 to receive information from and/or transmit information to other devices in environment 200.

Network analysis platform 230 includes one or more computing resources 240. For example, network analysis platform 230 may be a platform implemented by cloud computing environment 250. In some implementations, network analysis platform 230 is implemented by computing resources 240 of cloud computing environment 250.

Network analysis platform 230 may include a server device or a group of server devices. In some implementations, network analysis platform 230 may be hosted in cloud computing environment 250. Notably, while implementations described herein describe network analysis platform 230 as being hosted in cloud computing environment 250, in some implementations, network analysis platform 230 may be non-cloud-based or may be partially cloud-based.

Cloud computing environment 250 includes an environment that delivers computing as a service, whereby shared resources, services, etc. may be provided to radio access nodes 210, a network controller, one or more devices of a core network, and/or the like. Cloud computing environment 250 may provide computation, software, data access, storage, and/or other services that do not require end-user knowledge of a physical location and configuration of a system and/or a device that delivers the services. As shown, cloud computing environment 250 may include computing resources 240.

Computing resource 240 includes one or more personal computers, workstation computers, server devices, or another type of computation and/or communication device. In some implementations, computing resource 240 may host network analysis platform 230. The cloud resources may include compute instances executing in computing resource 240, storage devices provided in computing resource 240, data transfer devices provided by computing resource 240, etc. In some implementations, computing resource 240 may communicate with other computing resources 240 via wired connections, wireless connections, or a combination of wired and wireless connections.

As further shown in FIG. 2, computing resource 240 may include a group of cloud resources, such as one or more applications ("APPs") 240-1, one or more virtual machines ("VMs") 240-2, virtualized storage ("VSs") 240-3, one or more hypervisors ("HYPs") 240-4, or the like.

Application 240-1 includes one or more software applications that may be provided to or accessed by a radio access node 210, a network controller, one or more devices in a core network, and/or the like. Application 240-1 may eliminate a need to install and execute the software applications on such devices. For example, application 240-1 may include software associated with network analysis platform 230 and/or any other software capable of being provided via cloud computing environment 250. In some implementations, one application 240-1 may send/receive information to/from one or more other applications 240-1, via virtual machine 240-2.

Virtual machine 240-2 includes a software implementation of a machine (e.g., a computer) that executes programs like a physical machine. Virtual machine 240-2 may be either a system virtual machine or a process virtual machine, depending upon use and degree of correspondence to any real machine by virtual machine 240-2. A system virtual machine may provide a complete system platform that supports execution of a complete operating system ("OS"). A process virtual machine may execute a single program, and may support a single process. In some implementations, virtual machine 240-2 may execute on behalf of another device, and may manage infrastructure of cloud computing environment 250, such as data management, synchronization, or long-duration data transfers.

Virtualized storage 240-3 includes one or more storage systems and/or one or more devices that use virtualization techniques within the storage systems or devices of computing resource 240. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 240-4 provides hardware virtualization techniques that allow multiple operating systems (e.g., "guest operating systems") to execute concurrently on a host computer, such as computing resource 240. Hypervisor 240-4 may present a virtual operating platform to the guest operating systems, and may manage the execution of the guest operating systems. Multiple instances of a variety of operating systems may share virtualized hardware resources.

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, a core network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
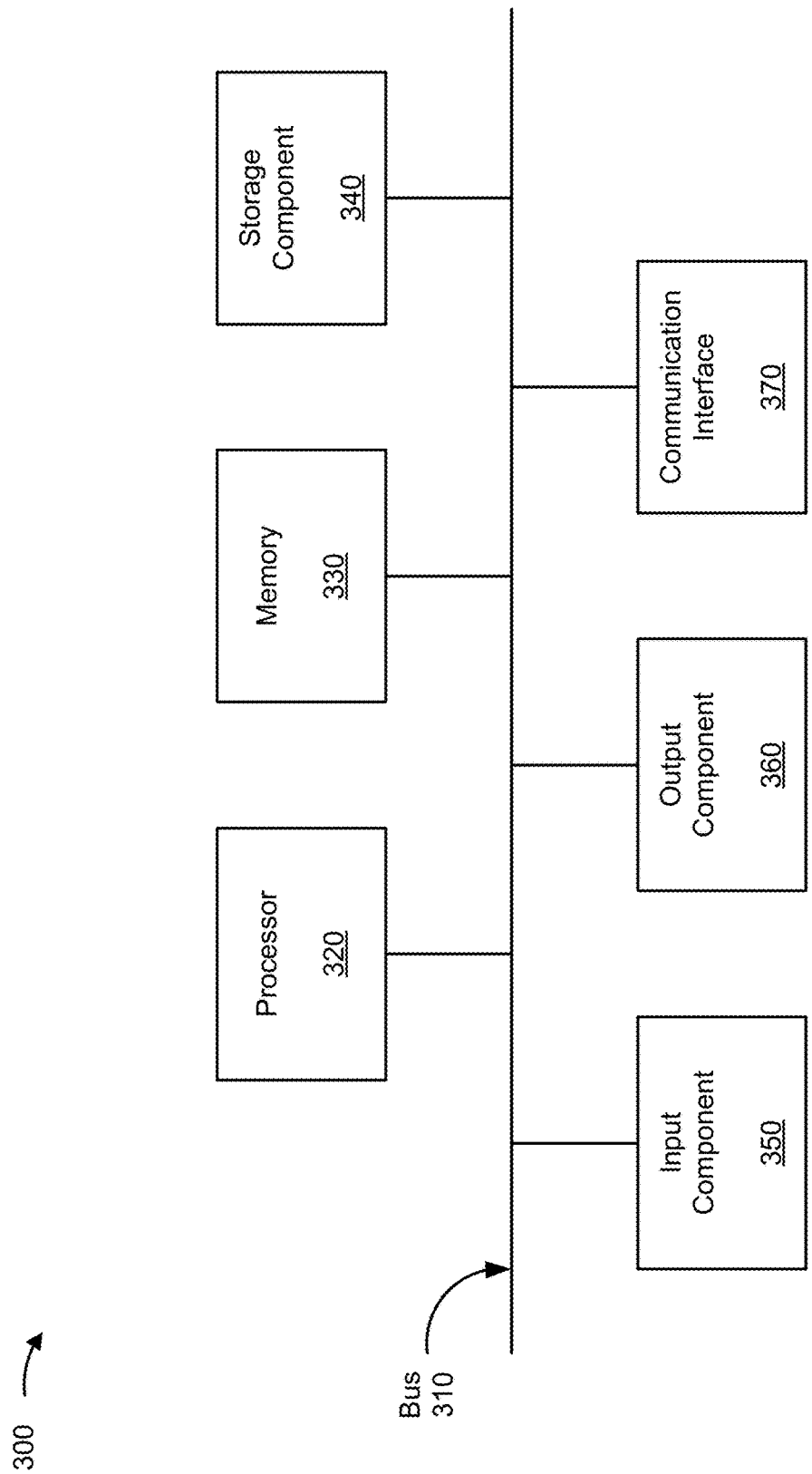
FIG. 3 is a diagram of example components of one or more devices of FIG. 2.

FIG. 3 is a diagram of example components of a device 300. Device 300 may correspond to radio access node 210, network storage device 220, network analysis platform 230, computing resource 240, cloud computing environment 250, and/or the like. In some implementations, radio access node 210, network storage device 220, network analysis platform 230, computing resource 240, and/or cloud computing environment 250, may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
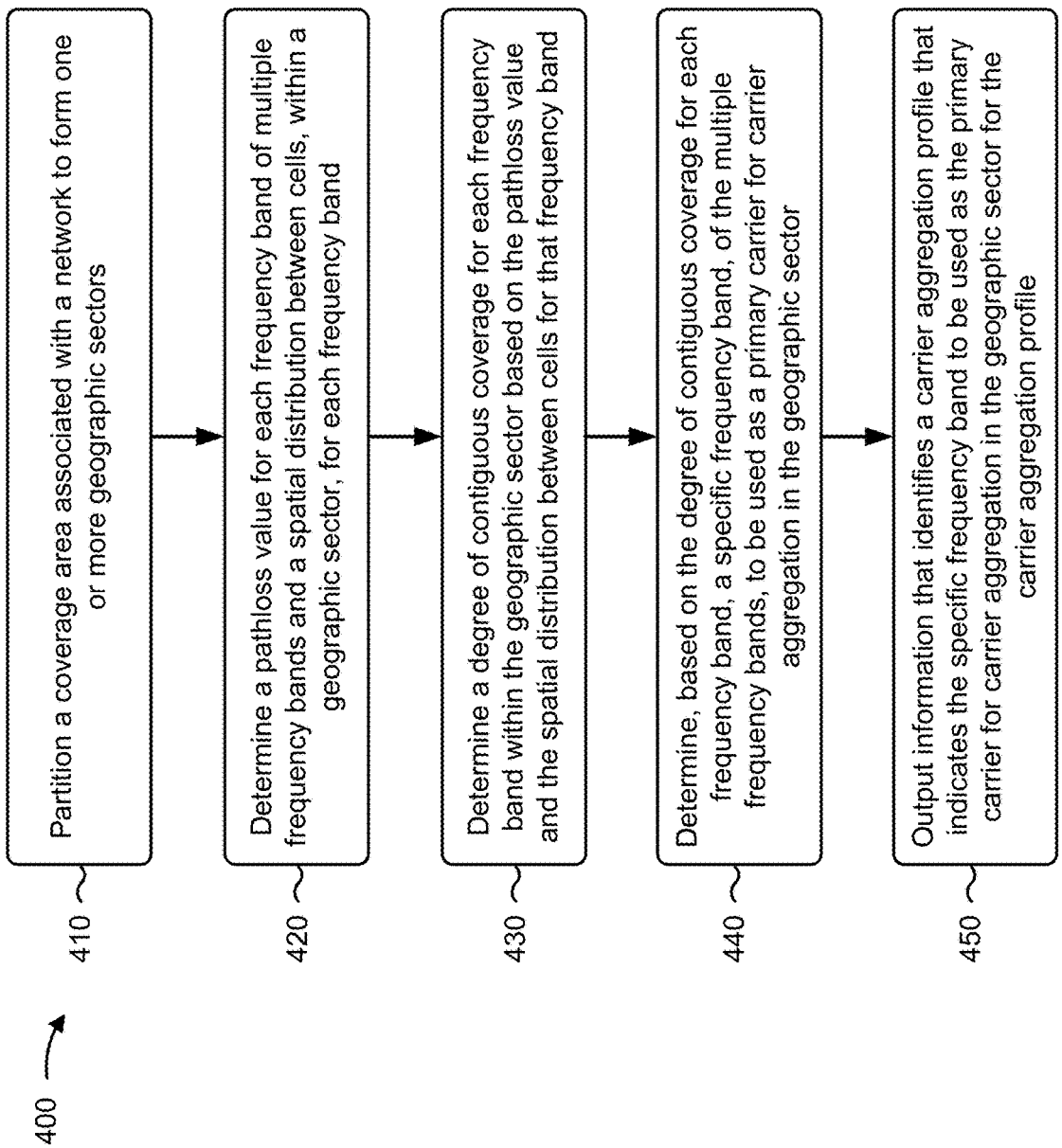
FIG. 4 is a flow chart of an example process for multi-band resource control.

FIG. 4 is a flow chart of an example process 400 for multi-band resource control. In some implementations, one or more process blocks of FIG. 4 may be performed by a network analysis platform (e.g., network analysis platform 230). In some implementations, one or more process blocks of FIG. 4 may be performed by another device or a group of devices separate from or including the network analysis platform, such as radio access node 210, network storage device 220, computing resource 240, cloud computing environment 250, and/or the like.

As shown in FIG. 4, process 400 may include partitioning a coverage area associated with a network to form one or more geographic sectors (block 410). For example, the network analysis platform (e.g., using processor 320, memory 330, and/or the like) may partition a coverage area associated with a network to form one or more geographic sectors, as described above. In some implementations, boundaries of a geographic sector, of the one or more geographic sectors, are determined based on a number of radio access nodes within the coverage area and/or locations of the radio access nodes within the coverage area, as described above.

In some implementations, boundaries of the geography sector are further determined based on at least one of: one or more radio access node types of one or more of the radio access nodes, one or more radio access technology types supported by one or more of the radio access nodes, a number of user devices within the coverage area, an inter-site distance between two or more radio access nodes within the coverage area, or a volume of network traffic associated with the coverage area.

As further shown in FIG. 4, process 400 may include determining a pathloss value for each frequency band of multiple frequency bands and a spatial distribution between cells, within a geographic sector, for each frequency band (block 420). For example, the network analysis platform (e.g., using processor 320, memory 330, and/or the like) may determine a pathloss value for each frequency band of multiple frequency bands, as described above. Additionally, or alternatively, the network analysis device may determine a spatial distribution between cells, within the geographic sector, for each frequency band, as described above.

In some implementations, the spatial distribution between cells of a frequency band is determined for multiple centroid distance percentiles associated with the cells of the frequency band.

As further shown in FIG. 4, process 400 may include determining a degree of contiguous coverage for each frequency band within the geographic sector based on the pathloss value and the spatial distribution between cells for that frequency band (block 430). For example, the network analysis platform (e.g., using processor 320, memory 330, and/or the like) may determine a degree of contiguous coverage for each frequency band within the geographic sector, as described above. In some implementations, the network analysis platform may determine the degree of contiguous coverage based on the pathloss value and the spatial distribution between cells, as described above. In some implementations, the degree of contiguous coverage for the frequency band is determined for the multiple centroid distance percentiles.

In some implementations, determining the degree of contiguous coverage includes determining a normalization factor for an unlicensed frequency band of the multiple frequency bands based on one or more measurements associated with the unlicensed frequency band, and determining a degree of contiguous coverage for the unlicensed frequency band based on the normalization factor. In some implementations, determining the degree of contiguous coverage includes determining a degree of contiguous coverage for a frequency band, of the multiple frequency bands, based on at least one of a reliability factor associated with the frequency band, an accessibility factor associated with the frequency band, a throughput factor associated with the frequency band, or a latency factor associated with the frequency band. In some implementations, determining the degree of contiguous coverage includes determining a degree of contiguous coverage for a frequency band, of the multiple frequency bands, in an indoor coverage scenario based on a measured pathloss value for the frequency band, determined based on measurements associated with user devices in the indoor coverage scenario, or an estimated pathloss value due to obstruction loss.

As further shown in FIG. 4, process 400 may include determining, based on the degree of contiguous coverage for each frequency band, a specific frequency band, of the multiple frequency bands, to be used as a primary carrier for carrier aggregation in the geographic sector (block 440). For example, the network analysis platform (e.g., using processor 320, memory 330, and/or the like) may determine a specific frequency band to be used as a primary carrier for carrier aggregation in the geographic sector, as described above. In some implementations, the network analysis platform may determine the specific frequency band based on the degree of contiguous coverage for each frequency band, as described above.

As further shown in FIG. 4, process 400 may include outputting information that identifies a carrier aggregation profile that indicates the specific frequency band to be used as the primary carrier for carrier aggregation in the geographic sector for the carrier aggregation profile (block 450). For example, the network analysis platform (e.g., using processor 320, memory 330, and/or the like) may output information that identifies one or more carrier aggregation profiles, as described above. In some implementations, a carrier aggregation profile, of the one or more carrier aggregation profiles, indicates the specific frequency band to be used as the primary carrier for carrier aggregation in the geographic sector for the carrier aggregation profile, as described above. In some implementations, the information that identifies the carrier aggregation profile is output to configure one or more access nodes within the coverage area.

In some implementations, each carrier aggregation profile, of the one or more carrier aggregation profiles, indicates a respective primary carrier and a respective set of secondary carriers associated with that carrier aggregation profile. In some implementations, different carrier aggregation profiles, of the one or more carrier aggregation profiles, are associated with different available bandwidths, different contiguity constraints for carrier aggregation, different radio access technologies, or different mobility constraints. In some implementations, the network analysis platform may identify a carrier aggregation profile, of the one or more carrier aggregation profiles, to be used in the geographic sector based on a measured mobility of user devices between the geographic sector and one or more neighboring geographic sectors, and a degree of contiguous coverage for each frequency band across the geographic sector and the one or more neighboring geographic sectors.

FIG. 4 shows example blocks of process 400. In some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    partitioning a coverage area associated with a network to form one or more geographic sectors,
        wherein boundaries of a geographic sector, of the one or more geographic sectors, are determined based on a number of radio access nodes within the coverage area and locations of the radio access nodes within the coverage area;
    determining a pathloss value for each frequency band of multiple frequency bands and a spatial distribution between cells, within the geographic sector, for each frequency band;
    determining a degree of contiguous coverage for each frequency band within the geographic sector based on the pathloss value and the spatial distribution between cells for that frequency band;
    determining, based on the degree of contiguous coverage for each frequency band, a specific frequency band, of the multiple frequency bands, to be used as a primary carrier for carrier aggregation in the geographic sector; and
    outputting information that identifies one or more carrier aggregation profiles,
        wherein a carrier aggregation profile, of the one or more carrier aggregation profiles, indicates the specific frequency band to be used as the primary carrier for carrier aggregation in the geographic sector for the carrier aggregation profile.

2. The method of claim 1, wherein the boundaries of the geographic sector are further determined based on at least one of:
    one or more radio access node types of one or more of the radio access nodes,
    one or more radio access technology types supported by one or more of the radio access nodes,
    a number of user devices within the coverage area,
    an inter-site distance between two or more radio access nodes within the coverage area, or
    a volume of network traffic associated with the coverage area.

3. The method of claim 1, wherein determining the degree of contiguous coverage comprises:
    determining a normalization factor for an unlicensed frequency band of the multiple frequency bands based on one or more measurements associated with the unlicensed frequency band; and
    determining a degree of contiguous coverage for the unlicensed frequency band based on the normalization factor.

4. The method of claim 1, wherein determining the degree of contiguous coverage comprises:
    determining a degree of contiguous coverage for a frequency band, of the multiple frequency bands, based on at least one of:
        a reliability factor associated with the frequency band,
        an accessibility factor associated with the frequency band,
        a throughput factor associated with the frequency band, or
        a latency factor associated with the frequency band.

5. The method of claim 1, wherein each carrier aggregation profile, of the one or more carrier aggregation profiles, indicates a respective primary carrier and a respective set of secondary carriers associated with that carrier aggregation profile.

6. The method of claim 1, wherein different carrier aggregation profiles, of the one or more carrier aggregation profiles, are associated with at least one of:
    different available bandwidths,
    different contiguity constraints for carrier aggregation,
    different radio access technologies, or
    different mobility constraints.

7. The method of claim 1, further comprising identifying a carrier aggregation profile, of the one or more carrier aggregation profiles, to be used in the geographic sector based on:
    a measured mobility of user devices between the geographic sector and one or more neighboring geographic sectors, and
    a degree of contiguous coverage for each frequency band across the geographic sector and the one or more neighboring geographic sectors.

8. The method of claim 1, wherein determining the degree of contiguous coverage comprises:
    determining a degree of contiguous coverage for a frequency band, of the multiple frequency bands, in an indoor coverage scenario based on at least one of:
        a measured pathloss value, for the frequency band, determined based on measurements associated with user devices in the indoor coverage scenario, or
        an estimated pathloss value due to obstruction loss.

9. A system, comprising:
    one or more memories; and
    one or more processors, communicatively coupled to the one or more memories, to:
        partition a coverage area of a network to form one or more geographic sectors,
            wherein boundaries of a geographic sector, of the one or more geographic sectors, are determined based on at least one of:
                a number of access nodes within the coverage area,
                locations of the access nodes within the coverage area,
                access node types of the access nodes,
                access technology types supported by the access nodes,
                a number of user devices within the coverage area, or
                a volume of network traffic associated with the coverage area;
        determine a pathloss value for one or more frequency bands, of multiple frequency bands, and a spatial distribution between cells, within the geographic sector, for the one or more frequency bands;

determine a degree of contiguous coverage for the one or more frequency bands within the geographic sector based on at least one of the pathloss value or the spatial distribution between cells;

determine, based on the degree of contiguous coverage, a specific frequency band, of the multiple frequency bands, to be used as a primary carrier for carrier aggregation in the geographic sector; and output information that identifies a carrier aggregation profile that indicates the specific frequency band to be used as the primary carrier for carrier aggregation in the geographic sector for the carrier aggregation profile.

10. The system of claim 9, wherein the spatial distribution between cells of a frequency band is determined for multiple centroid distance percentiles associated with the cells of the frequency band.

11. The system of claim 10, wherein the degree of contiguous coverage for the frequency band is determined for the multiple centroid distance percentiles.

12. The system of claim 10, wherein the information that identifies the carrier aggregation profile is output to configure one or more access nodes within the coverage area.

13. The system of claim 9, wherein the one or more processors, when determining the degree of contiguous coverage, are configured to:

determine a normalization factor for an unlicensed frequency band of the multiple frequency bands based on one or more measurements associated with the unlicensed frequency band; and determine a degree of contiguous coverage for the unlicensed frequency band based on the normalization factor.

14. The system of claim 9, wherein the degree of contiguous coverage for a frequency band, of the one or more frequency bands, is determined based on at least one of:

a reliability factor associated with the frequency band,
an accessibility factor associated with the frequency band,
a throughput factor associated with the frequency band, or
a latency factor associated with the frequency band.

15. The system of claim 9, wherein the carrier aggregation profile indicates a set of frequency bands to be used as secondary carriers for carrier aggregation in the geographic sector for the carrier aggregation profile.

16. A non-transitory computer-readable medium storing instructions for wireless communication, the instructions comprising:

one or more instructions that, when executed by one or more processors of a device, cause the one or more processors to:

partition a wireless coverage area to form one or more geographic sectors,
wherein boundaries of a geographic sector, of the one or more geographic sectors, are determined based on at least two of:
a number of access nodes within the coverage area,
one or more locations of the access nodes within the coverage area,
one or more access node types of the access nodes,
one or more access technology types supported by the access nodes,
a number of user devices within the coverage area, or
a volume of network traffic associated with the coverage area;

determine respective pathloss values, for respective frequency bands, and respective spatial distribution between cells, within the geographic sector, for the respective frequency bands;

determine respective degrees of contiguous coverage for the respective frequency bands within the geographic sector based on the respective pathloss values and the respective spatial distributions between cells;

determine, based on the respective degrees of contiguous coverage, respective primary carrier frequency bands, of multiple frequency bands, for respective carrier aggregation profiles in the geographic sector; and output information that identifies a plurality of carrier aggregation profiles,
wherein each carrier aggregation profile indicates a respective primary carrier frequency band to be used as a primary carrier for carrier aggregation in the geographic sector for that carrier aggregation profile.

17. The non-transitory computer-readable medium of claim 16, wherein each carrier aggregation profile, of the plurality of carrier aggregation profiles, indicates a respective set of secondary carrier frequency bands, of the multiple frequency bands, associated with that carrier aggregation profile.

18. The non-transitory computer-readable medium of claim 16, wherein different carrier aggregation profiles, of the plurality of carrier aggregation profiles, are associated with at least one of:

different available bandwidths,
different contiguity constraints for carrier aggregation,
different radio access technologies, or
different mobility constraints.

19. The non-transitory computer-readable medium of claim 16, wherein the one or more instructions, when executed by the one or more processors, further cause the one or more processors to identify a carrier aggregation profile, of the plurality of carrier aggregation profiles, to be used in the geographic sector based on:

a measured mobility of user devices between the geographic sector and one or more neighboring geographic sectors, and
a degree of contiguous coverage for each frequency band, of the multiple frequency bands, across the geographic sector and the one or more neighboring geographic sectors.

20. The non-transitory computer-readable medium of claim 16, wherein the one or more instructions, that cause the one or more processors to determine the degree of contiguous coverage, cause the one or more processors to:

determine a degree of contiguous coverage for a frequency band, of the multiple frequency bands, in an indoor coverage scenario based on at least one of:
a measured pathloss value, for the frequency band, determined based on measurements associated with user devices in the indoor coverage scenario, or
an estimated pathloss value due to obstruction loss.

* * * * *